(12) United States Patent
Granzotto

(10) Patent No.: US 10,518,706 B2
(45) Date of Patent: Dec. 31, 2019

(54) FOLDING STEP FOR POP-UP VEHICLE

(71) Applicant: MORryde International, Inc., Elkhart, IN (US)

(72) Inventor: Anthony J. Granzotto, Constantine, MI (US)

(*) Notice: Subject to any disclaimer, the term of this patent is extended or adjusted under 35 U.S.C. 154(b) by 0 days.

(21) Appl. No.: 16/278,291

(22) Filed: Feb. 18, 2019

(65) Prior Publication Data

US 2019/0256005 A1 Aug. 22, 2019

Related U.S. Application Data

(60) Provisional application No. 62/631,916, filed on Feb. 18, 2018.

(51) Int. Cl.
| | |
|---|---|
| *B60R 3/02* | (2006.01) |
| *B60J 5/06* | (2006.01) |
| *B60P 3/34* | (2006.01) |
| *E06C 5/20* | (2006.01) |

(52) U.S. Cl.
CPC ............... *B60R 3/02* (2013.01); *B60J 5/067* (2013.01); *B60P 3/34* (2013.01); *E06C 5/20* (2013.01)

(58) Field of Classification Search
CPC ..... B60R 3/02; B60J 5/067; B60P 3/34; E06C 5/20
See application file for complete search history.

(56) References Cited

U.S. PATENT DOCUMENTS

| | | | | |
|---|---|---|---|---|
| 4,264,084 A | * | 4/1981 | Telles | B60R 3/02 |
| | | | | 182/115 |
| 5,280,934 A | * | 1/1994 | Monte | B60R 3/02 |
| | | | | 182/127 |
| 2008/0150251 A1 | * | 6/2008 | Roth | B60R 3/00 |
| | | | | 280/166 |

* cited by examiner

*Primary Examiner* — Bryan A Evans
(74) *Attorney, Agent, or Firm* — Botkin & Hall, LLP

(57) ABSTRACT

A pop-up camper has a roof that is movable between a stored position where it is close to a perimeter wall and use position where it is raised away from the perimeter wall. The perimeter wall has a gap that receives a door that is attached to the pop-up camper at the floor level. The door pivots between a stored position where panel spans and seals a gap in the sidewall and use position where the panel folds down and a terminal edge is close to the ground. The door includes stringers with steps that extend between. Adjustable feet are received at the end of the stringers adjacent the terminal edge and telescopically slide between a stored position where the feet are locked from rotation and do not extend beyond the terminal edge and an extended position where the feet can pivot.

19 Claims, 18 Drawing Sheets

US 10,518,706 B2

FOLDING STEP FOR POP-UP VEHICLE

CROSS REFERENCE TO RELATED APPLICATIONS

This application claims the benefit of U.S. Provisional Application No. 62/631,916, filed Feb. 18, 2018, the disclosures of which are hereby incorporated by reference.

BACKGROUND OF THE INVENTION

Folding staircases are useful for pop-up campers, but the space constraints for such a staircase to be stored with the camper is difficult. For ease of use, it is highly desirable that a staircase for getting into a pop-up camper be attached to the camper and stored within it. A staircase that is attached to a pop-up camper would ideally be smoothly operated and not obstruct the door that occupants of the camper would use to enter and exit the camper. Additionally, a folding staircase should be smoothly integrated into the camper so that it does not protrude from the vehicle when it is stowed and all of the parts of the staircase should be tightly held in their stowed position so that none of the parts rattle when the camper travels down roads.

SUMMARY OF THE INVENTION

The present disclosure describes a folding step for a pop-up camper. The pop-up camper has a roof that moves between a raised position that creates a living space and a lowered position where the roof is contacting or in close proximity to a perimeter wall. As is common in pop-up campers, the perimeter wall is short and fabric extends between the roof and the perimeter wall to create the living space when the roof is in the raised position. The camper has a floor and the perimeter wall has a gap that creates an opening to access the living space. The folding step is attached to the camper adjacent the floor and pivots about a hinge to a stowed position where it occupies the opening and a panel affixed thereto bridges across the gap in the perimeter wall. The panel seals the opening in the perimeter wall. The folding step can pivot to a use position where the folding step is clear of the opening. The folding step has adjustable legs that can move between a retracted position and an extended position. In the extended position, feet located on the legs can pivot to accommodate for ground surface variation and irregularities. In the retracted position, the feet are constrained. The folding step has a terminal edge that is spaced from the hinge, and in the retracted position, the feet do not extend beyond the terminal edge.

DESCRIPTION OF THE PREFERRED EMBODIMENT

Figure 6:
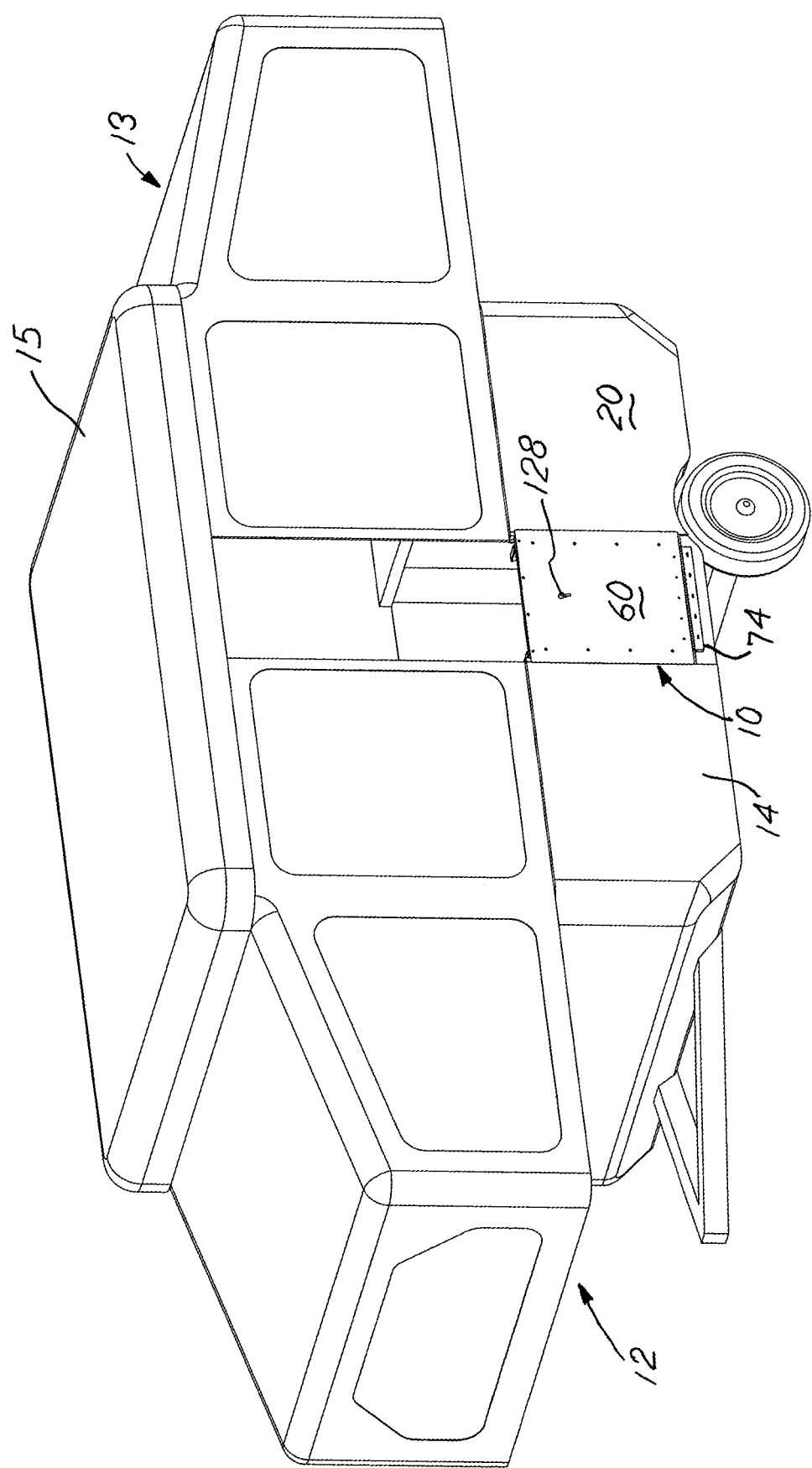
FIG. 6 is a perspective view of the pop-up camper with the staircase of FIGS. 1-5 in its stowed position.
Figure 7:
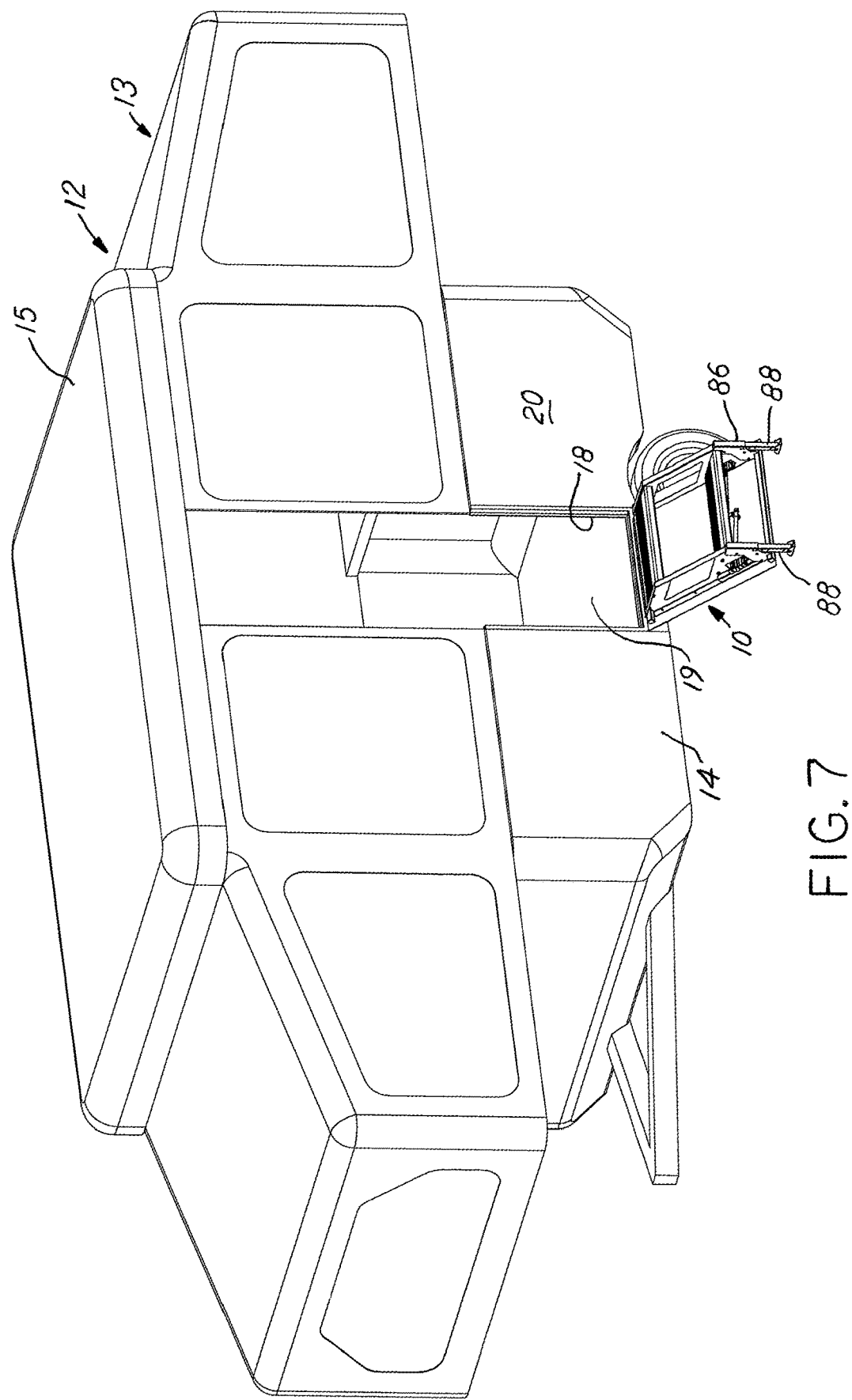
FIG. 7 is a perspective view of the pop-up camper in FIG. 6 with the staircase of FIGS. 1-6 in its use position.
Figure 8:
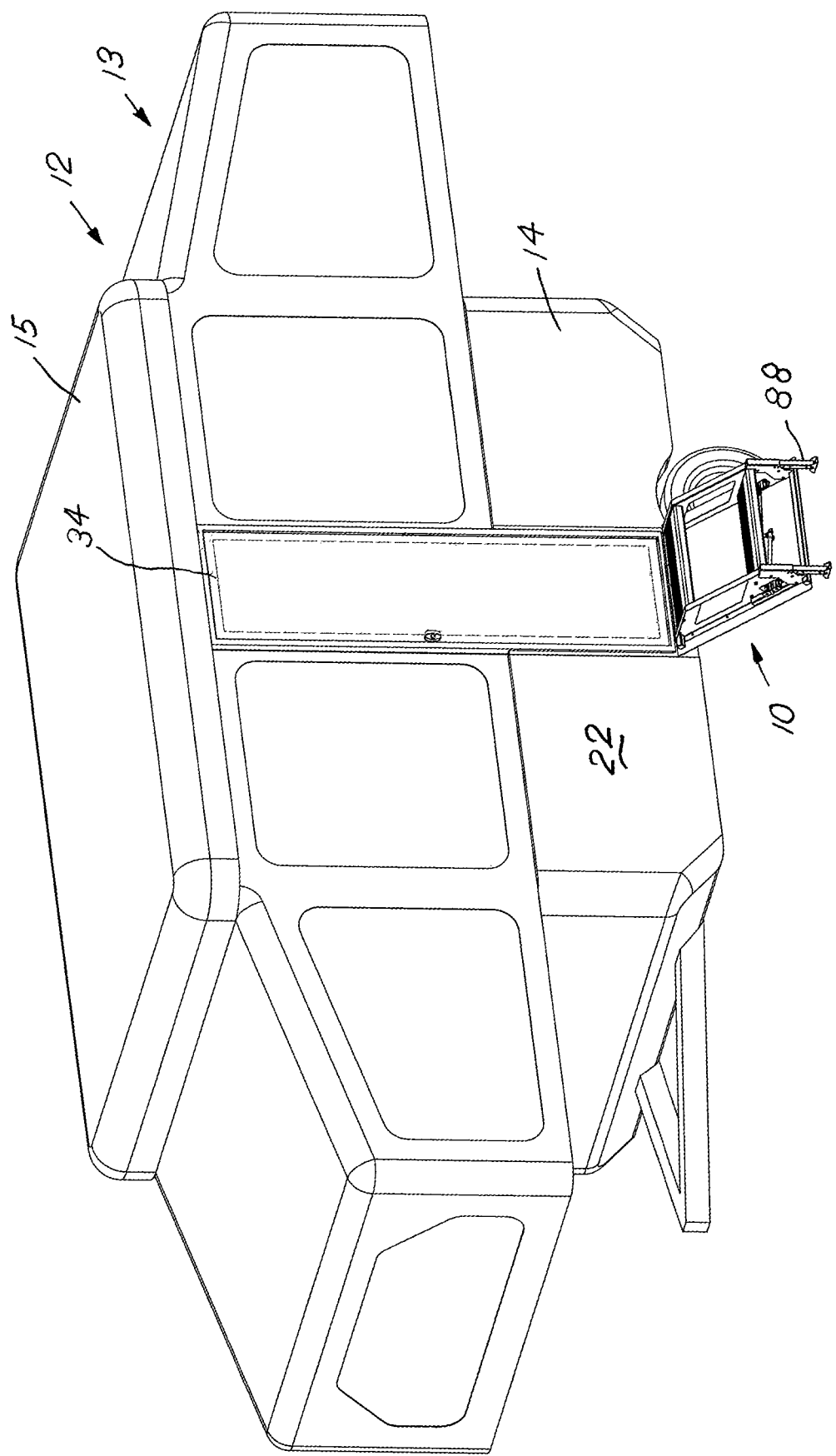
FIG. 8 is a perspective view of the pop-up camper in FIGS. 6 and 7 with the door and its removable frame located within the opening that receives the staircase and the staircase being in its use position with the door in its closed position.
Figure 9:
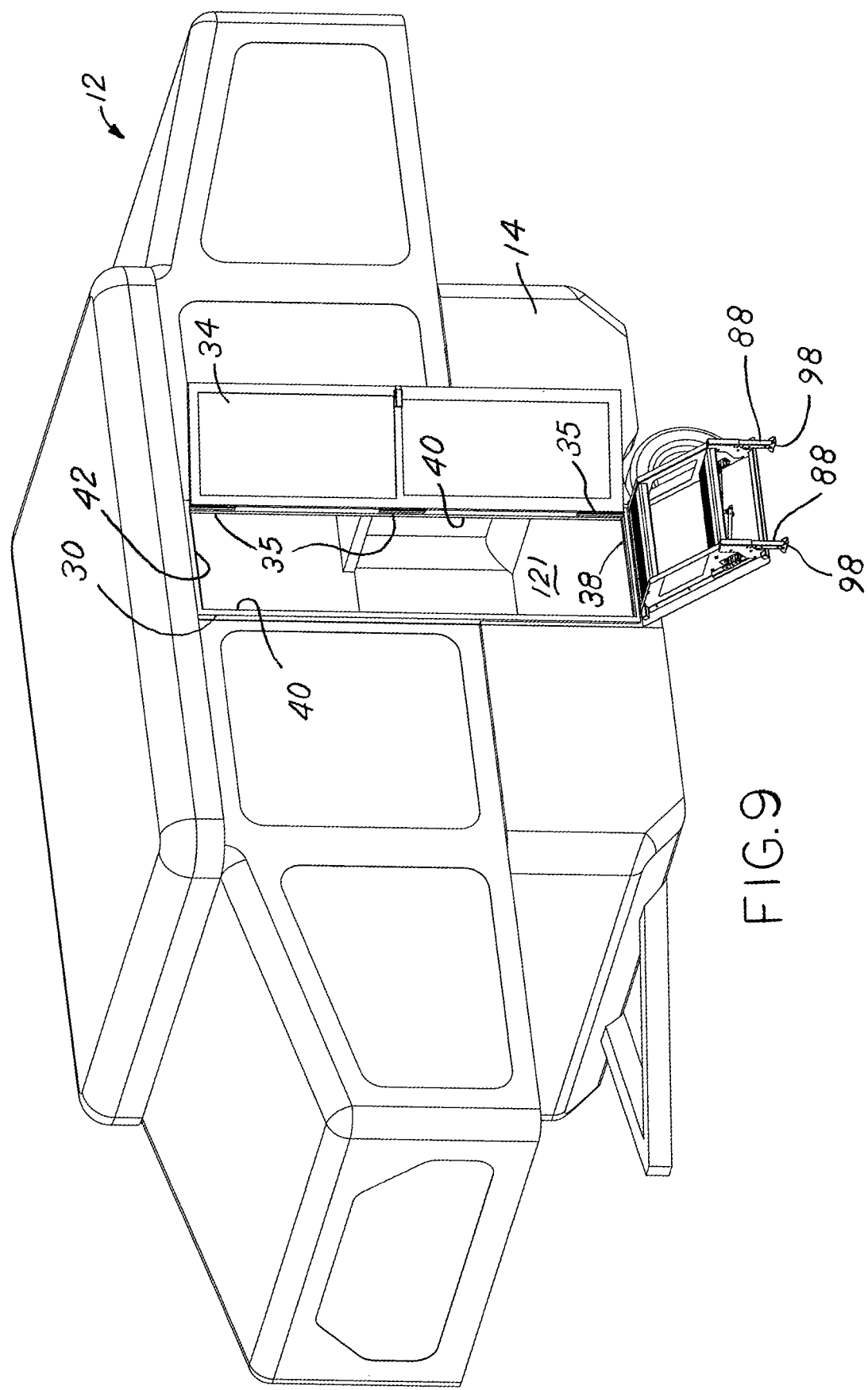
FIG. 9 is a perspective view of the pop-up camper in FIGS. 6 and 8 with the door and its removable frame located within the opening that receives the staircase and the staircase being in its use position with the door in its open position above the staircase.
Figure 10:
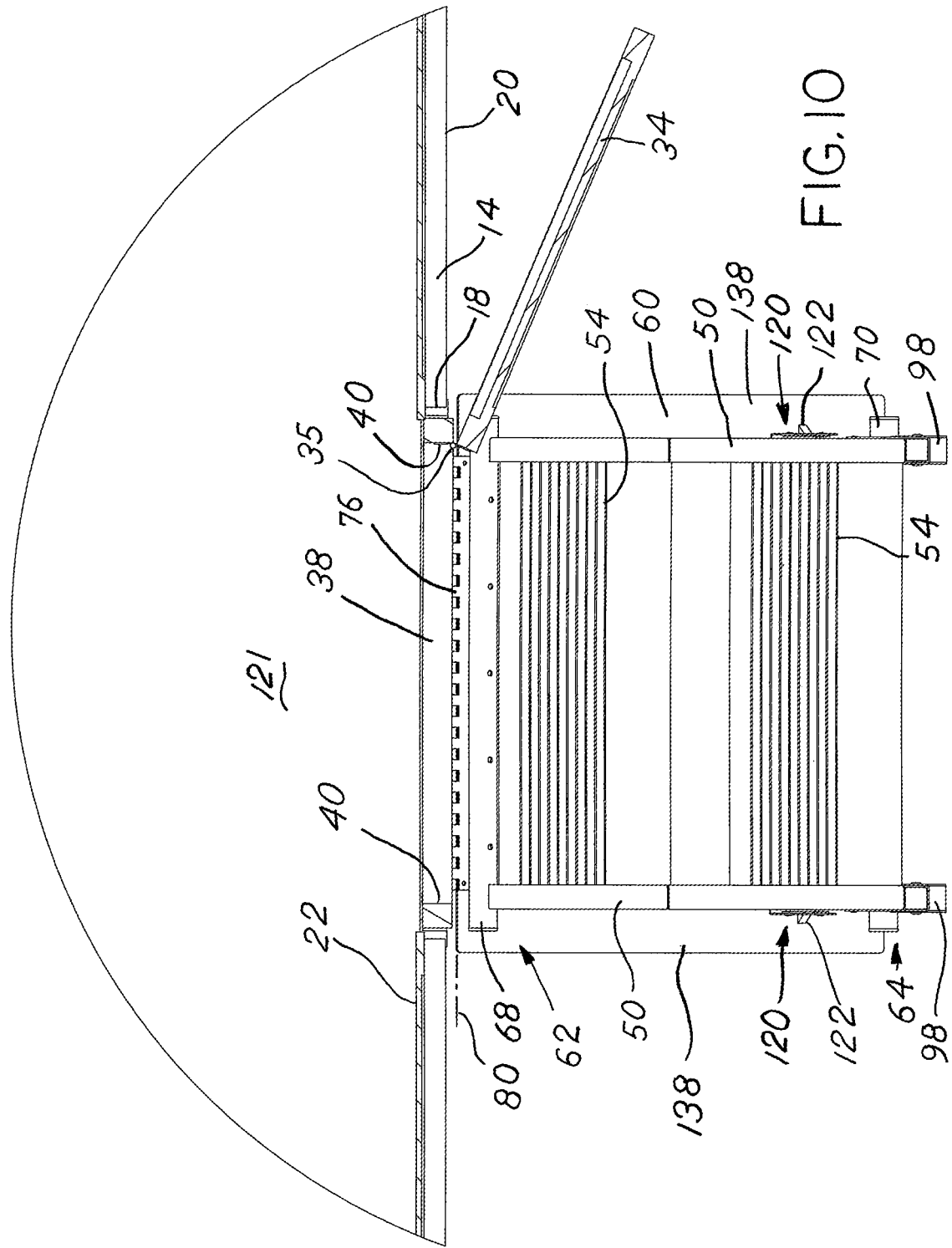
FIG. 10 is a view of the staircase in FIGS. 1-9 from above with the staircase in its use position and the door in its open position.
Figure 11:
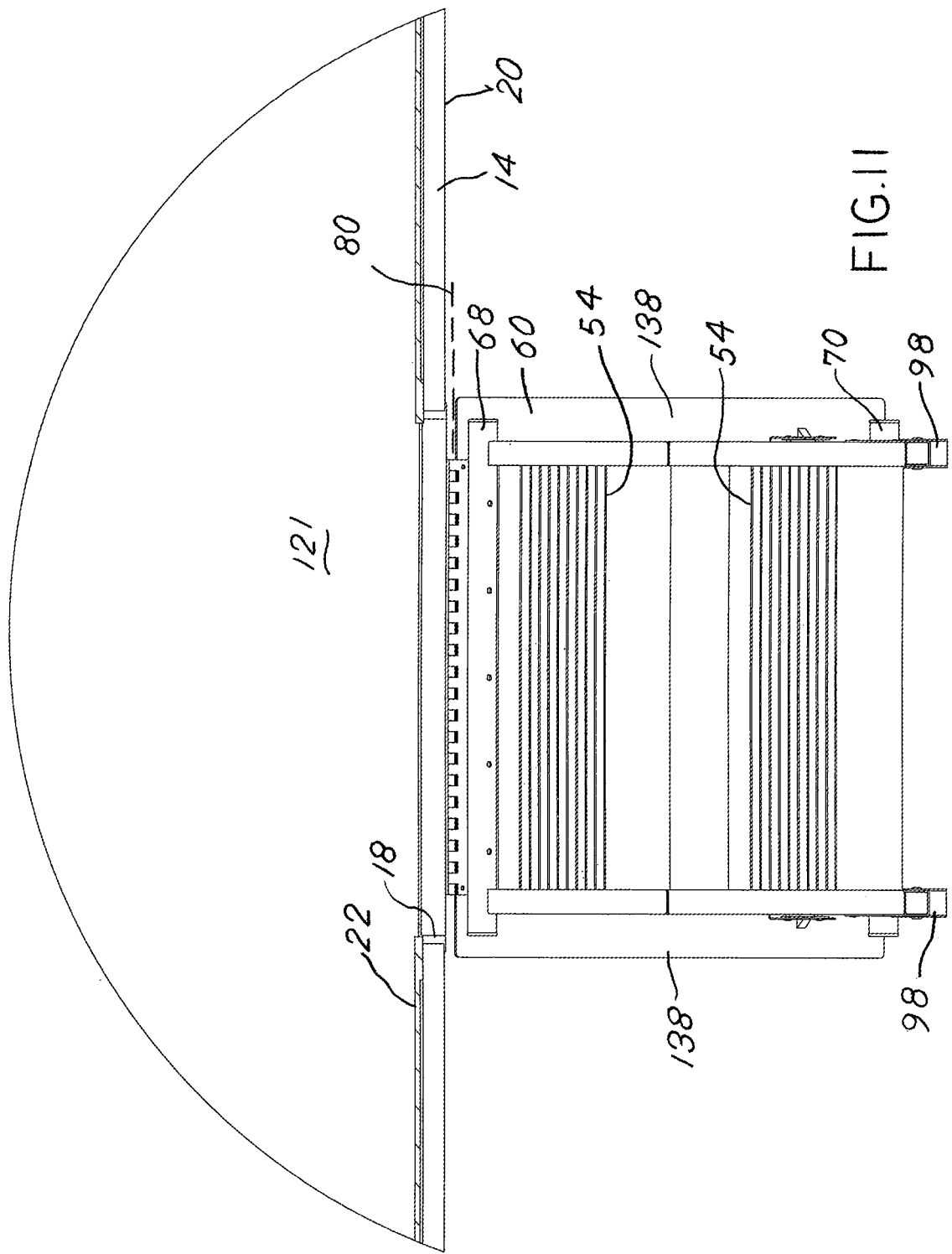
FIG. 11 is a view of the staircase in FIGS. 1-10 from above with the staircase in its use position and the door not located within the fixed frame.
Figure 12:
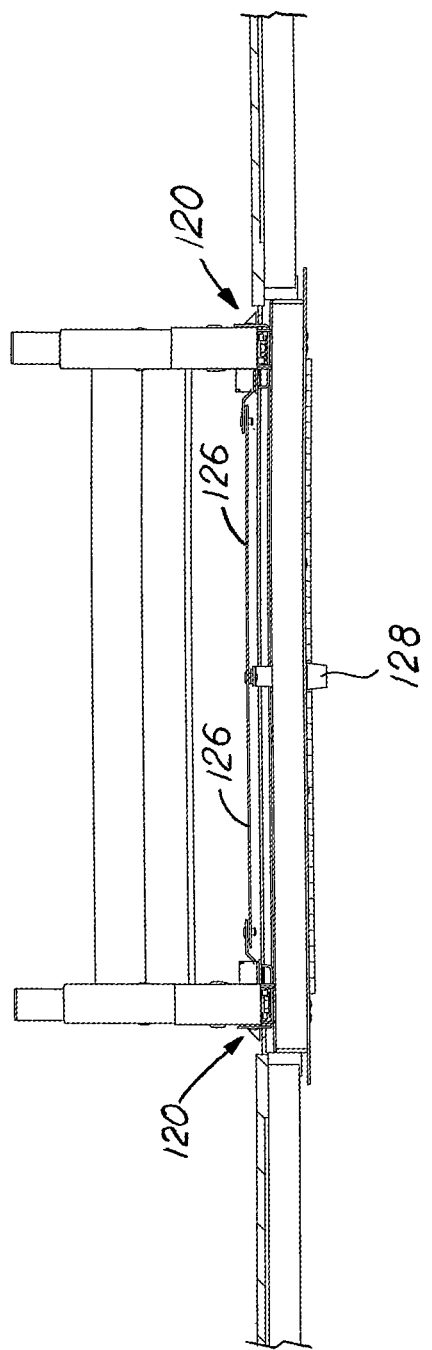
FIG. 12 is a view of the staircase in FIGS. 1-11 from above with the staircase in its stowed position.
Figure 13:
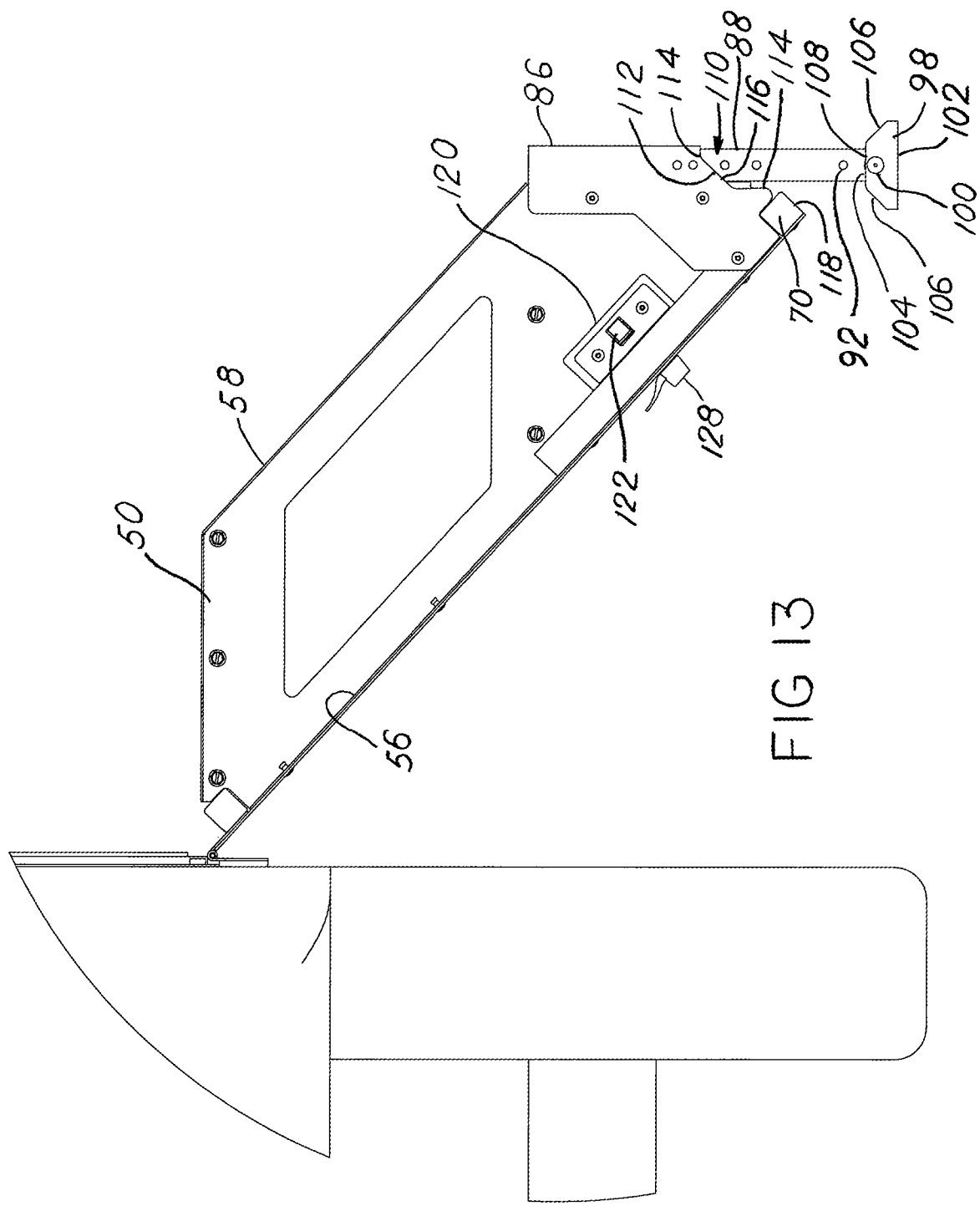
FIG. 13 is a side view of the staircase shown in FIGS. 1-12 in its use position with the support legs in their extended position.
Figure 17:
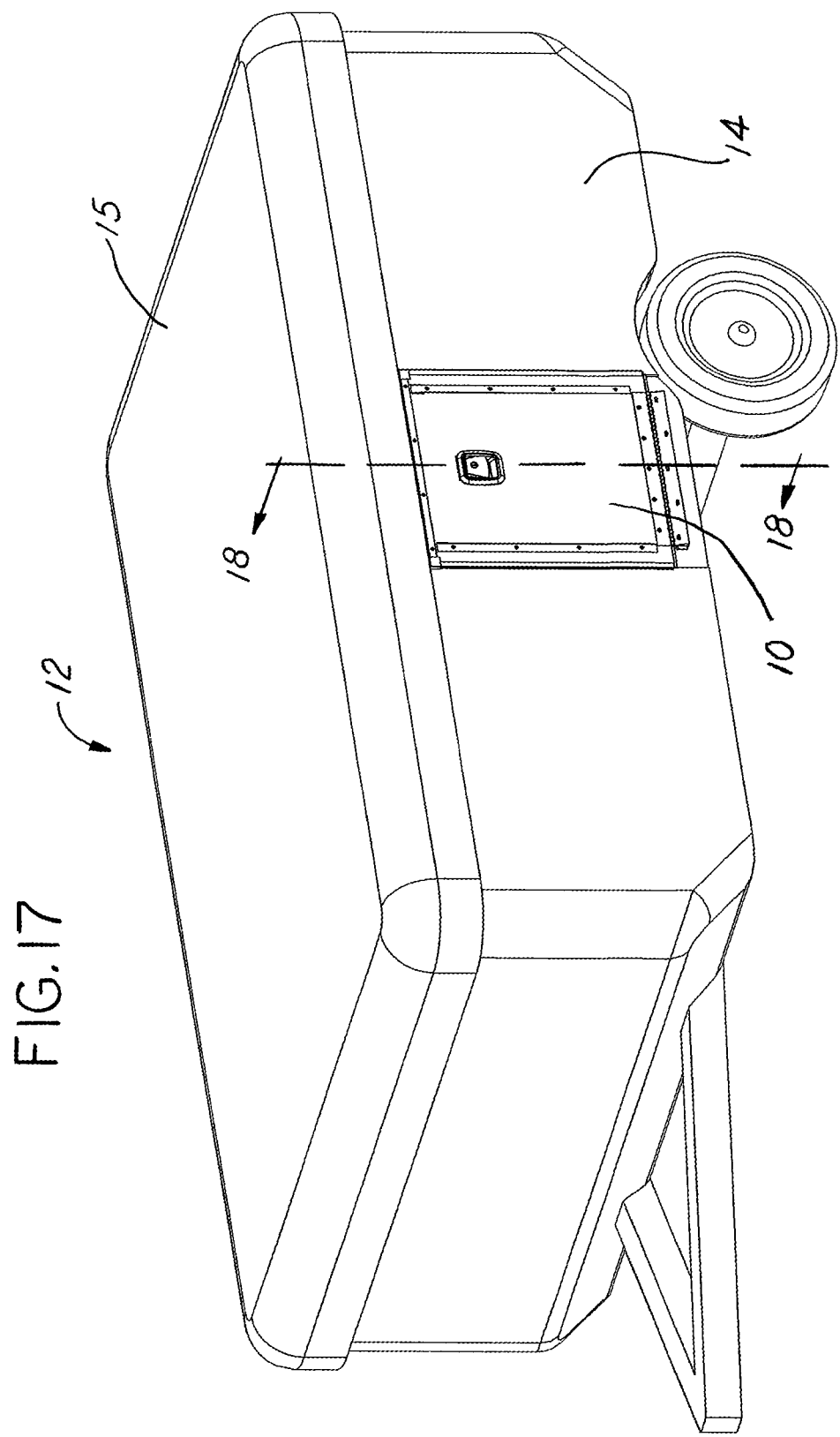
FIG. 17 is a perspective view of the pop-up camper with the staircase and roof in their stowed position.

The folding staircase 10 of the present invention is particularly useful in pop-up campers 12. FIG. 6 shows the pop-up camper 12. The pop-up camper 12 has a lower wall 14 that includes a fixed frame 18. The pop-up camper 12 has an upper structure 13 that includes a roof 15 that moves with respect to the lower wall 14. The roof 15 is movable between a collapsed position (shown in FIG. 17) that locates the roof 15 adjacent to the lower wall 14 where the lower surface 17 contacts or nearly contacts a top edge 11 of the lower wall 14, and the roof 15 has a raised position that is shown in FIGS. 6-9 where it is relatively far from the top edge of the lower wall 14. The lower wall 14 has an outside surface 20 and an inside surface 22. The fixed frame 18 lines an opening 19 in the lower wall 14. The opening 19 is also referred to as a gap. The fixed frame 18 has an outer flange 24 that rests on the outside surface 20 of the lower wall 14 and the outer flange 24 serves to locate the fixed frame 18 at a desired depth within the lower wall 14. The fixed frame 18 has an inner flange 28 that is more near the inside surface 22 of the wall 14. The fixed frame 18 is fastened to the lower wall 14 and does not move with respect to the lower wall 14. The fixed frame 18 is adapted to receive a removable frame 30. The removable frame 30 is removable from the fixed frame 18 and may be stowed in a location within the camper 12 outside of the fixed frame 18. This stowed position of the removable frame 30 is not shown, but it is common to attach it to the underside of the roof 15. The use position of the removable frame 30 that locates the removable frame 30 within the fixed frame 18 is well shown in FIGS. 4, 7, and 9. The removable frame 30 acts as a frame for a door 34 that is hingedly attached to the removable frame 30 with hinges 35. The entire assembly of the removable frame 30 and the door 34 are foldable to a stowed position that is removed from the fixed frame 18. FIG. 7 shows the fixed frame 18 without the removable frame 30 being located within the fixed frame 18. The removable frame 30 has a threshold 38, two vertical door jambs 40 and a header 42 that form a perimeter that surrounds the door 34. The removable frame 30 provides structure for the door 34 above the lower wall 14. This is useful because often the structure 13 of the camper 12 between the lower wall 14 and roof 15 is made of a flexible material such as cloth or screen. Within the removable frame 30 the door 34 is pivotable between an opened position as shown in FIG. 9 and a closed position that is shown in FIG. 8.

Figure 16:
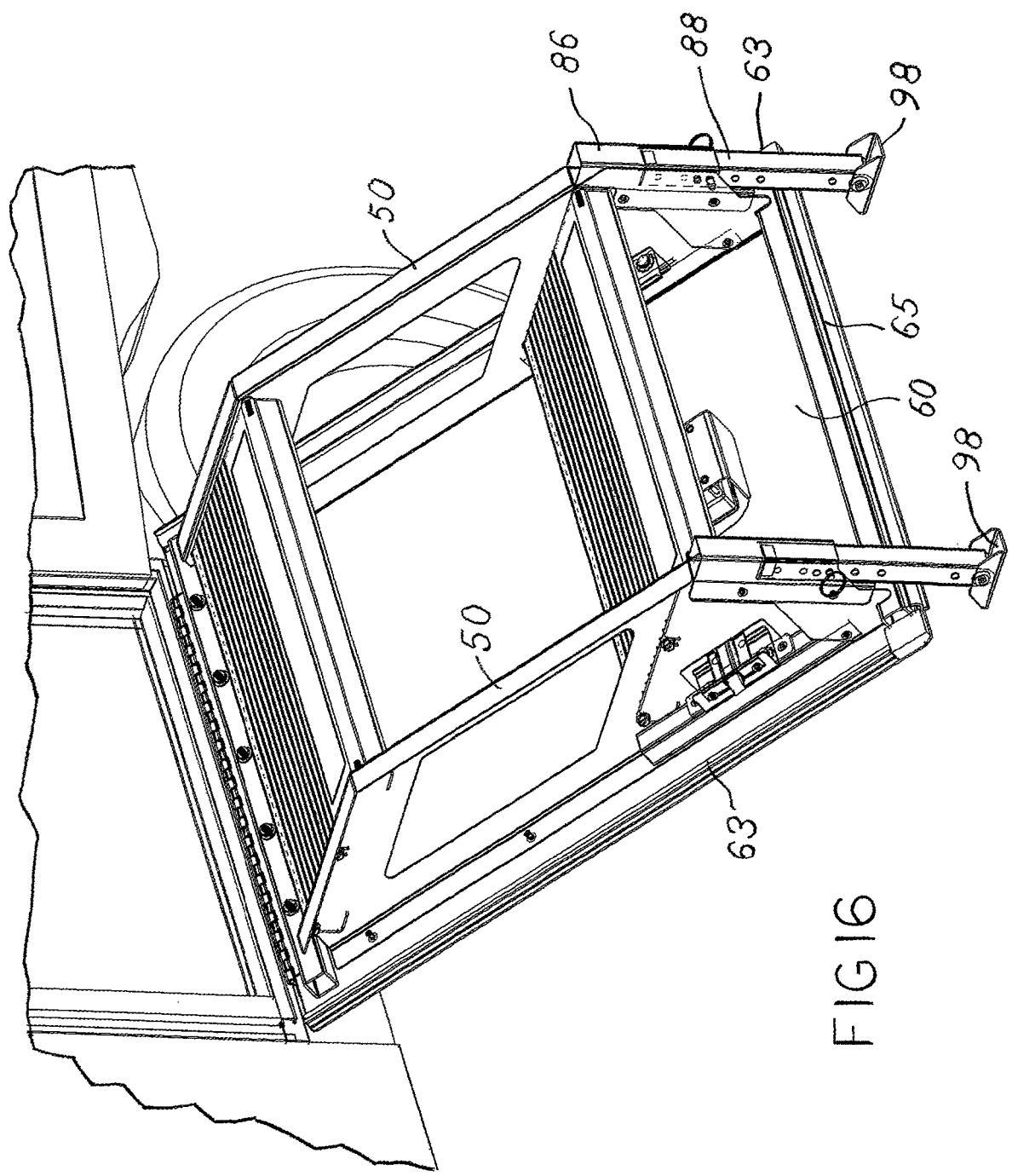
FIG. 16 is a partial view 16 of the staircase in FIG. 7.

The folding staircase 10 has a pair of stringers 50. The stringers 50 are spanned by treads 54. The treads 54 may be attached to the stringers 50 by welding or mechanical fasteners. As shown, the staircase 10 has two treads 54, but other quantities of treads are contemplated, based on the needs of the user and the height of the floor of the camper 12 from the ground. The stringers 50 have a lower edge 56 and an upper edge 58. A panel 60 is joined across the lower edges 56 of the stringers 50. The panel 60 extends beyond the stringers 50 where it can cover the opening 19 and overlay portions of the lower wall 14 and/or the fixed frame 18 in the stored position. As shown in FIG. 16, lateral edges of the panel 60 have a seal 63 with another seal 65 at the terminal edge. The stringers 50 have an upper end 62 and a lower end 64. The upper ends 62 of the stringers 50 are capped by an upper tube 68 that serves as a structural member to rigidify the panel 60. The lower ends 64 of the stringers 50 are capped by a lower tube 70 that also rigidifies the panel 60. The lower tube 70 defines a terminal edge spaced from a hinge 74. The hinge 74 is attached near the upper ends 62 of the stringers 50. The hinge 74 has a first plate 76 that is pivotally attached to a second plate 78 and is also known as a piano hinge. The first and second plates 74, 78 pivot with respect to each other about a pivot axis 80. The first plate 76 serves as a vehicle mounting plate that is mounted to the outside surface 20 of the lower wall 14. The second plate 78 is mounted to the staircase 10. Thus, the pivot axis 80 and hinge 74 are fixed with respect to the fixed frame 18 in the lower wall 14.

Figure 1:
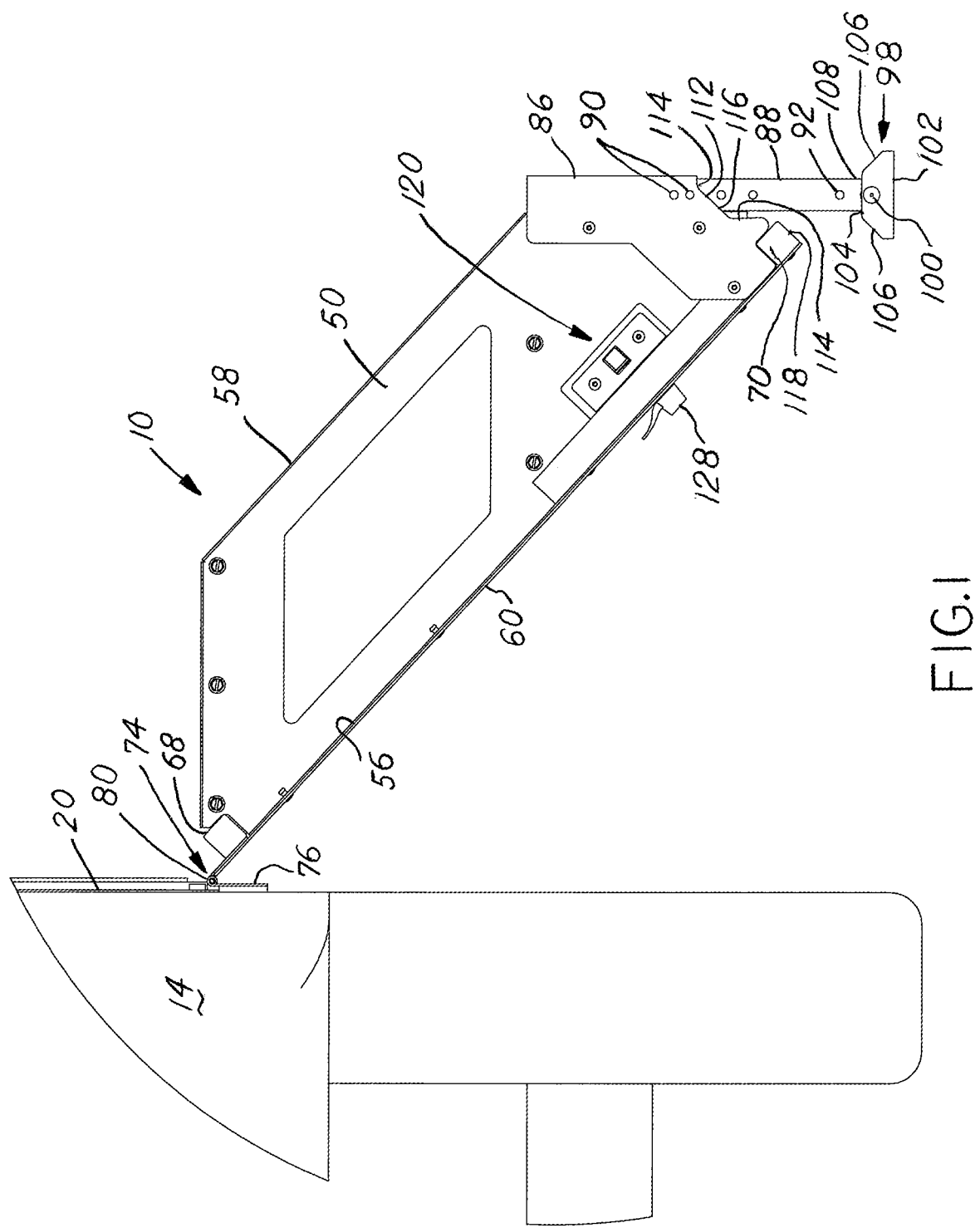
FIG. 1 is a side view of the staircase in its use position and viewed from the front of a camper with the support legs extended.
Figure 2:
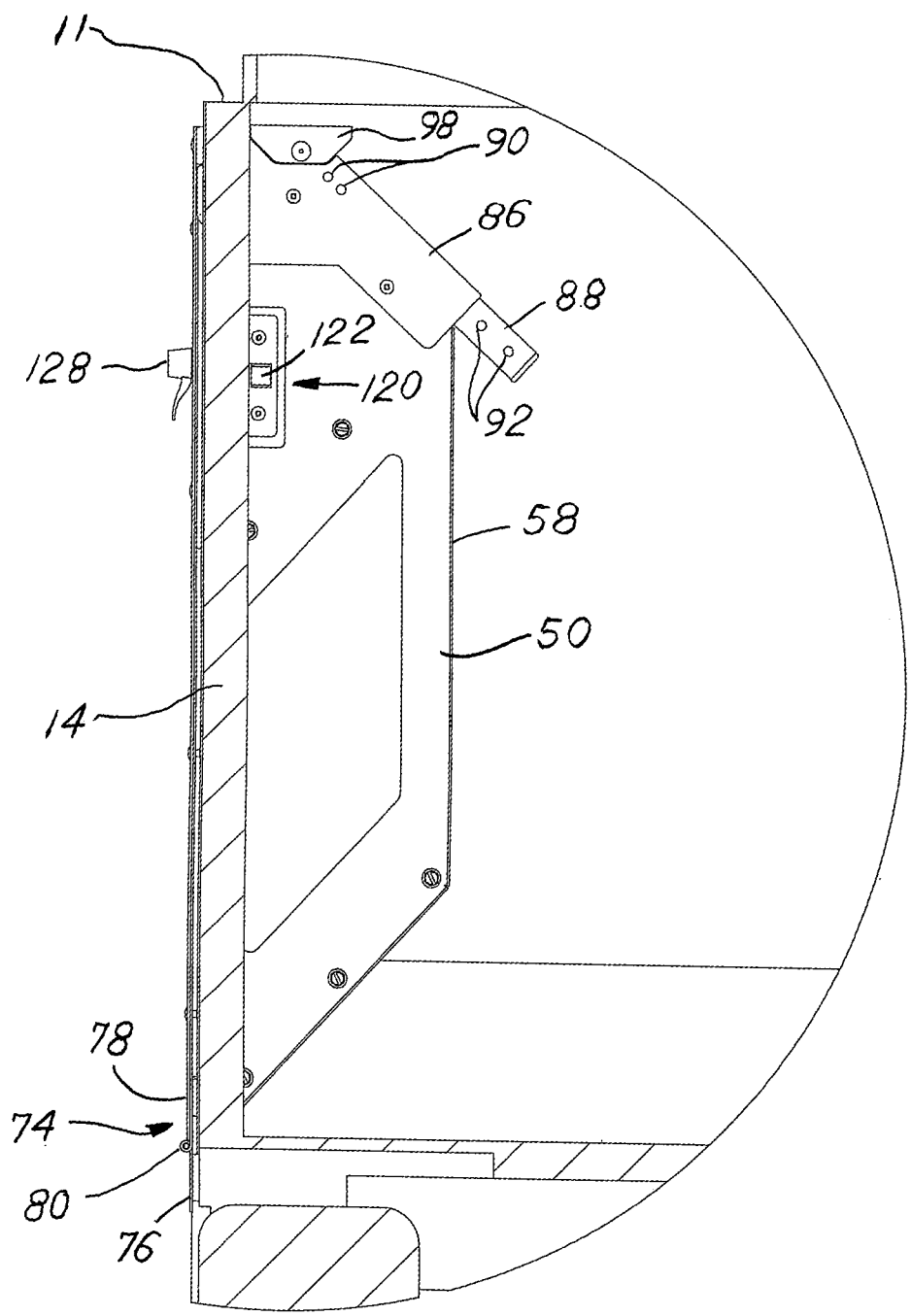
FIG. 2 is side section of the staircase in FIG. 1 in its stowed position.
Figure 3:
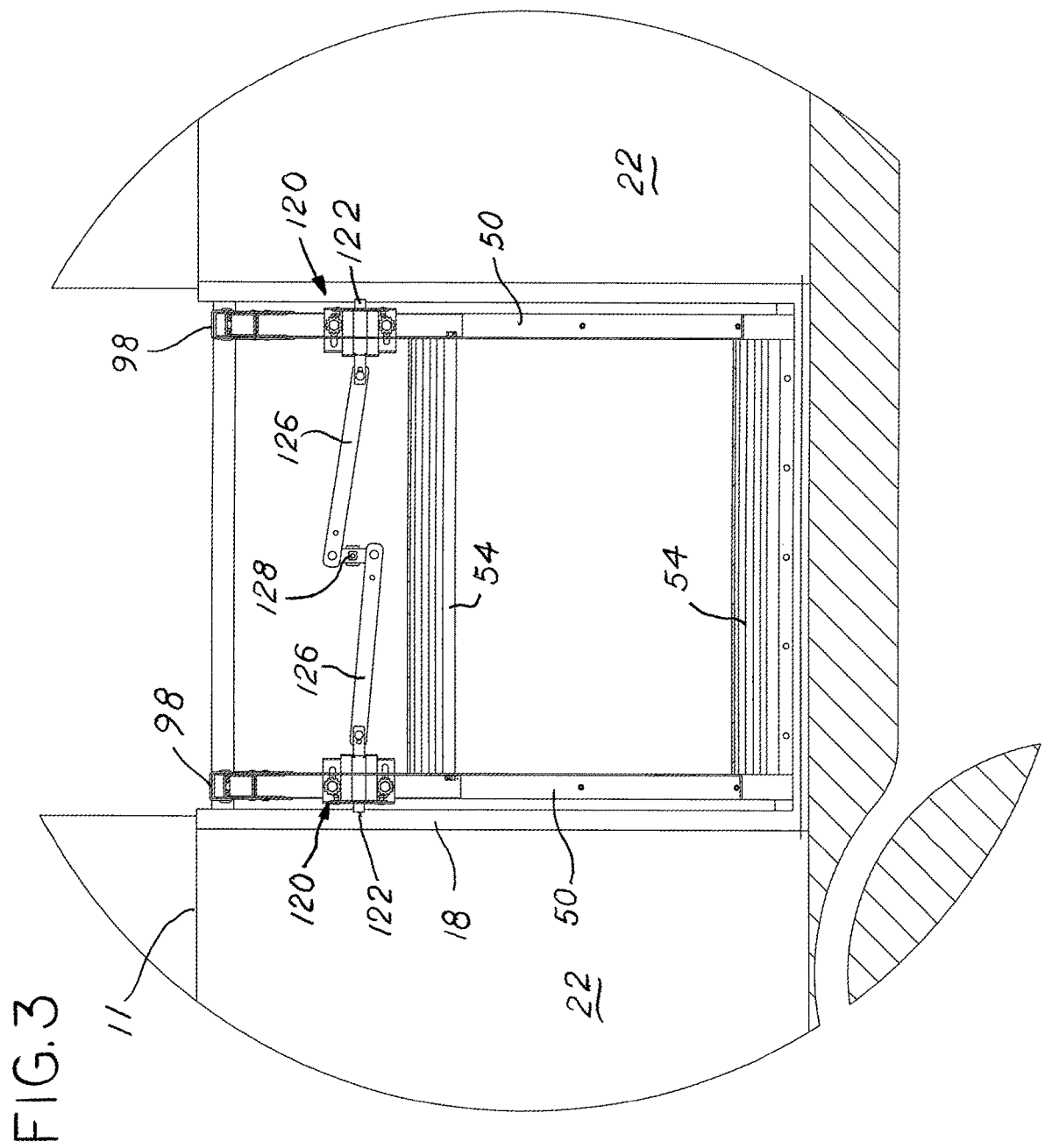
FIG. 3 is a view of the staircase in FIGS. 1 and 2 in its stowed position as seen from inside the camper.
Figure 14:
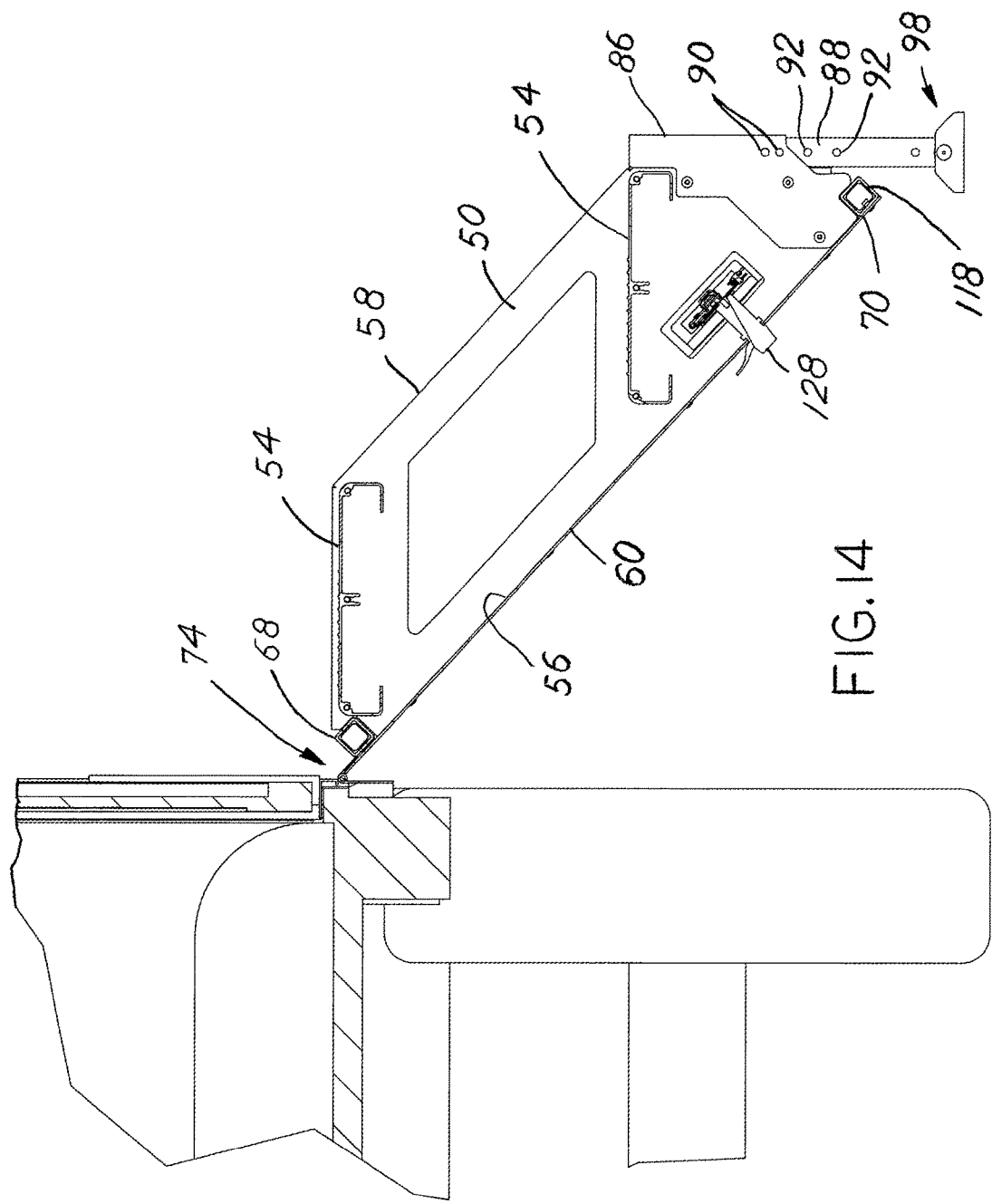
FIG. 14 is a sectional view of the staircase shown in FIG. 13 taken through the center of the staircase.
Figure 15:
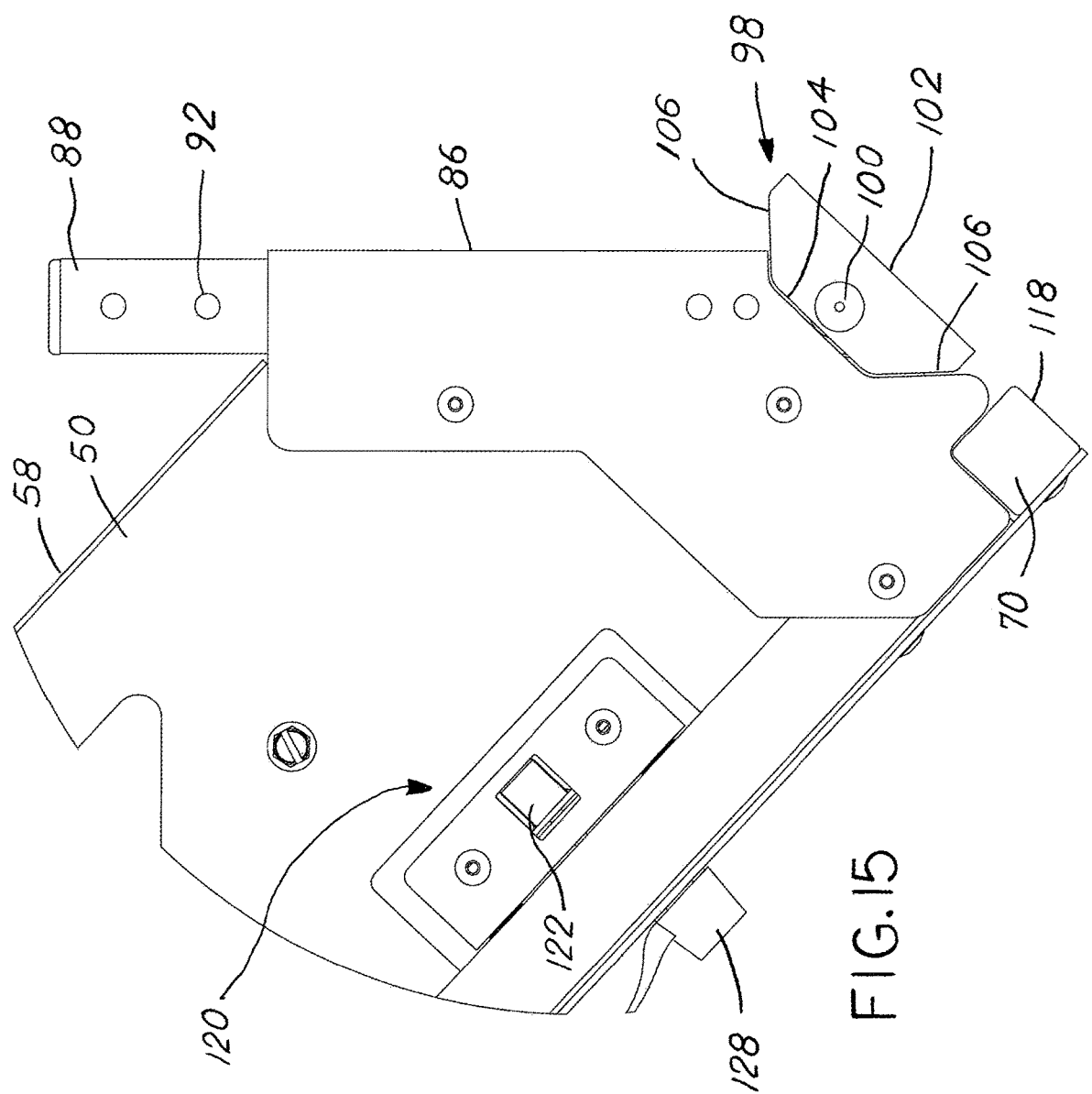
FIG. 15 is a magnified view of the staircase shown in FIGS. 1-14 with the support leg retracted and the foot in its locked position within the receiving pocket

Each of the stringers 50 have a leg mounting tube 86. A support leg 88 is telescopingly received in the leg mounting tube 86. Each leg mounting tube 86 has holes 90 that are adapted to receive a locking pin (not shown). The holes 90 in the leg mounting tubes 86 are adapted to align with holes 92 in each leg 88. When the holes 90 in the leg mounting tubes 86 are aligned with the holes 92 in the legs 88, locking pins may be inserted into the legs 88 and leg mounting tubes 86 to adjust the position in which the legs are locked within the leg mounting tubes 86. The lower ends of each leg 88 include a foot 98. The feet 98 are pivotally connected to each leg 88 with a pin 100. It is contemplated that the locking of the legs use spring-loaded pins captured inside the legs such that they extend outwardly into the holes 90 in the mounting tubes 86 when aligned. The feet 98 have a lower surface 102 that is for contacting the ground upon which the leg 88 is intended to rest upon. Pivoting of the feet 98 allows for proper contact of uneven ground. The feet 98 have an upper surface 104 that includes angled portions 106. A middle portion 108 of the upper surface 104 that is located between the angled portions 106 of the upper surface 104, and the upper surface 104 is parallel to the lower surface 102 of the foot 98. The leg mounting tubes 86 end in a receiving pocket 110. The receiving pocket 110 has a lower surface 112 that has angled portions 114 that flank a flat portion 116 that is in between the angled portions 114. The receiving pockets 110 are complementary to the upper surfaces 104 of the feet 98. The angled portions 114 of the receiving pockets 110 are angled with respect to the leg 88, which is shown as a rectangular tube. As each leg 88 in its corresponding leg mounting tube 86 is slidably drawn toward its corresponding stringer 50, the angled portion 106 of the foot 98 will strike the lower tube 70 and then the angled portion 114 of the receiving pocket 110. Because the receiving pockets 110 have a complementary shape to the feet 98, the feet 98 will be locked when the legs 88 are fully retracted as shown in FIG. 15. When the legs 88 are in their fully retracted position as shown in FIGS. 2 and 15, the feet 98 will be aligned with or inset from the end of the staircase 10, which corresponds to the lowermost surface 118 of the lower tube 70 as shown in FIG. 14. When the legs 88 are locked in their fully retracted positions, the feet 98 will be prevented from rattling as the camper 12 travels due to the complementary locking action with respect to the receiving pocket 110.

Figure 4:
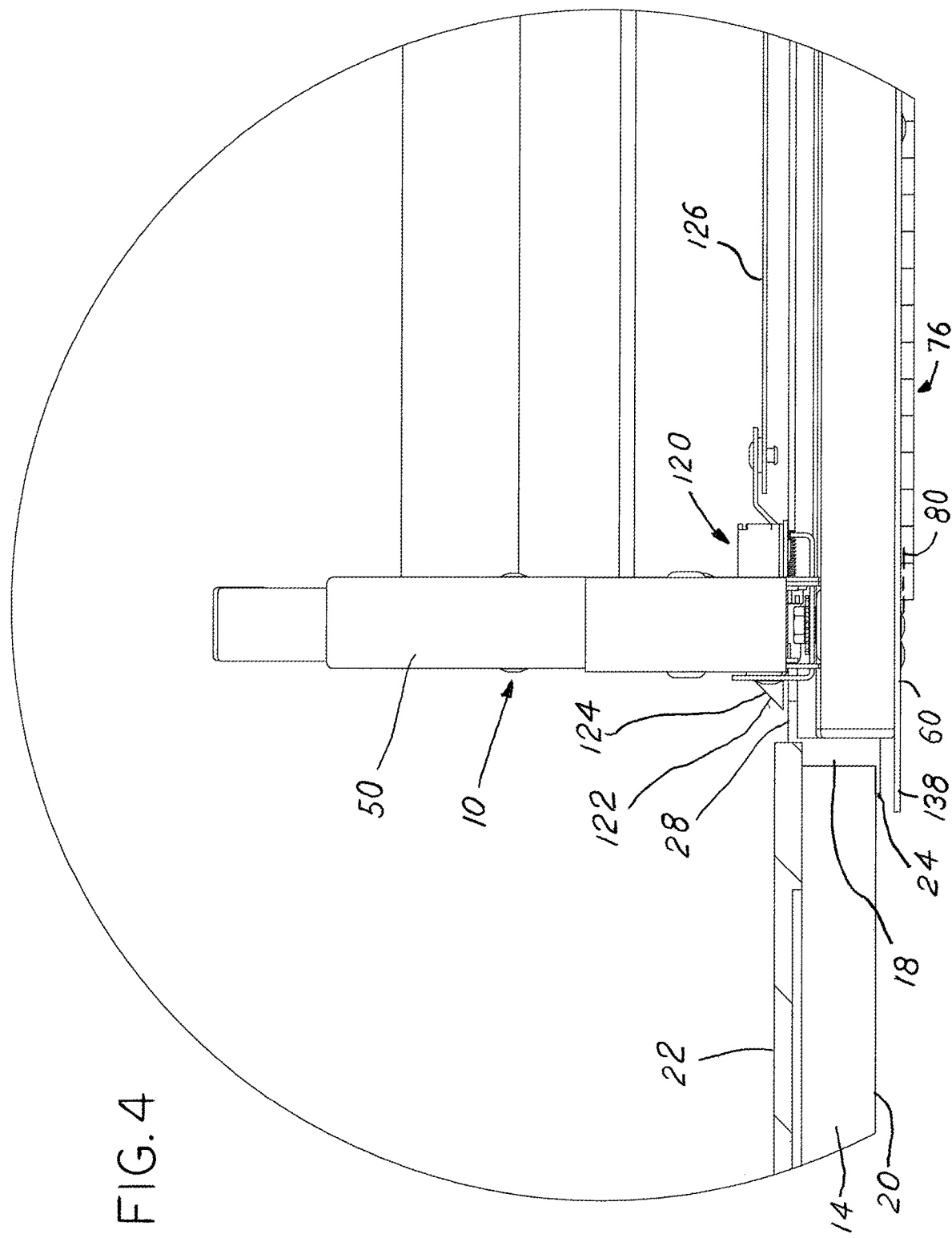
FIG. 4 is a magnified view of the locking mechanism of the staircase with the staircase in its locked position as shown in FIG. 6.
Figure 5:
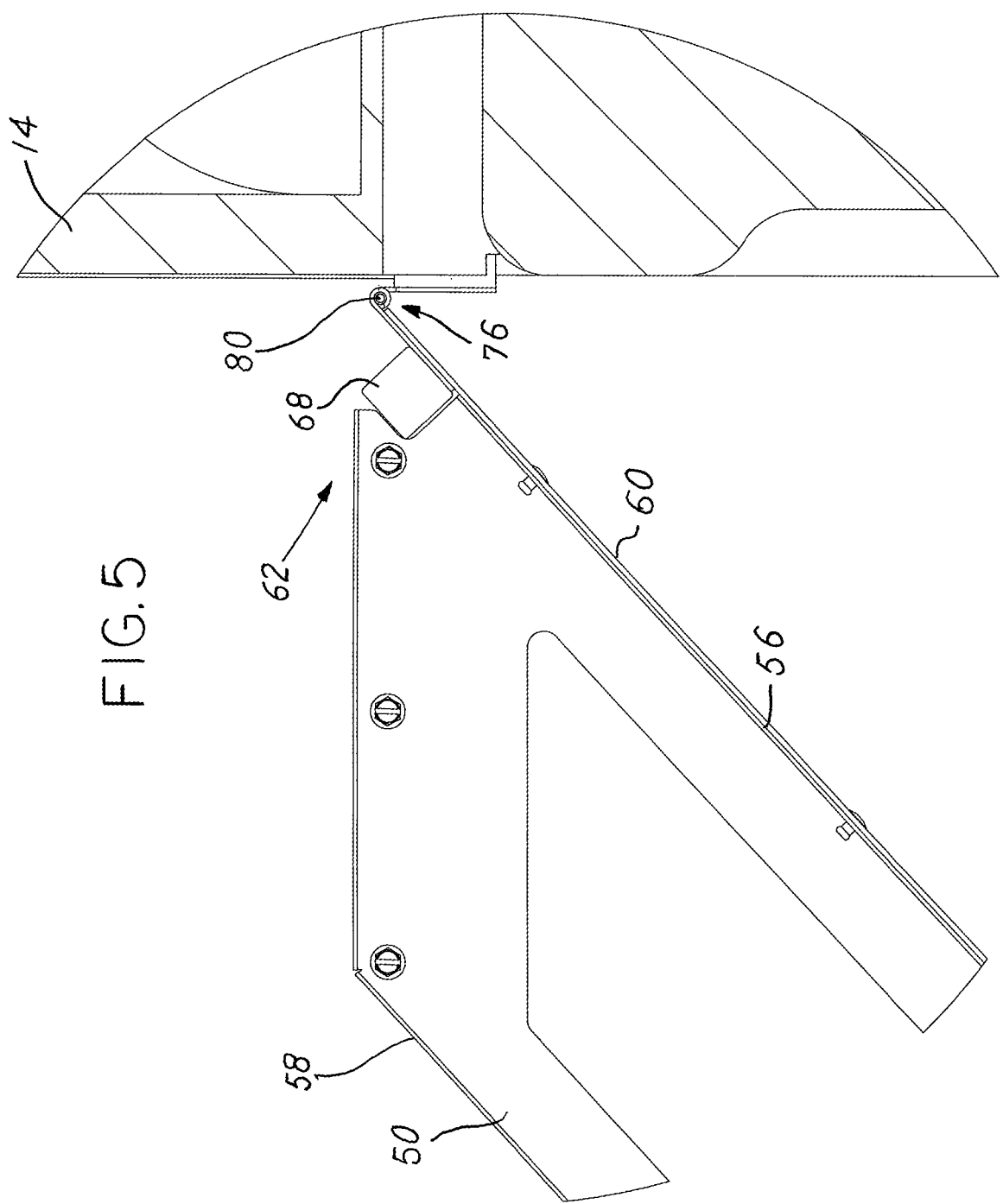
FIG. 5 is a magnified view of the staircase in its use position as shown in FIG. 7.
Figure 18:
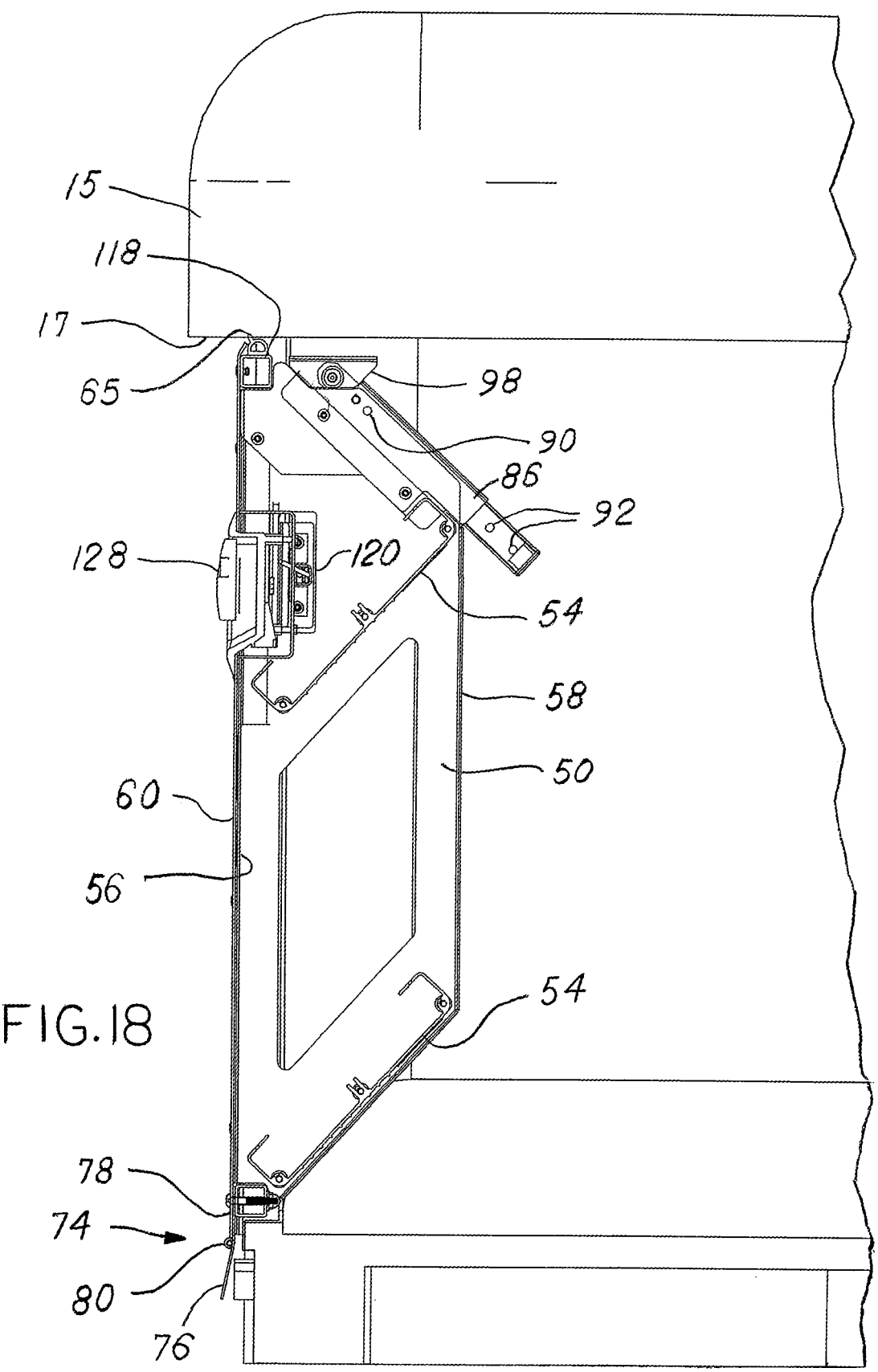
FIG. 18 is a partial side section view 18-18 of the pop-up camper in FIG. 17.

The staircase 10 is pivotable about the pivot axis 80 from a use position that is shown in FIGS. 7-10 to a stowed position that is shown in FIGS. 2, 4, and 6. The use position locates the stringers 50 within the fixed frame 18. As such, the stringers 50 extend into the interior space 121 of the camper 12. The use position locates the stringers 50 entirely outside of the fixed frame 18. In this position, the stringers 50 are on the same side of the fixed frame 18 and opening 19 as the hinge 74 and the pivot axis 80 of the hinge 74. In other words, the entire staircase 10 will be located outside of the camper 12 and the fixed frame 18 and opening 19 will be unobstructed because no part of the staircase 10 is located in the fixed frame 18 when the staircase 10 is in its use position. When the staircase 10 is in its use position, the leg mounting tubes 86 are substantially parallel to the lower wall 14. This orients the legs 88 as being parallel with the lower wall 14. Having the legs 88 parallel to the lower wall 14 in the use position is useful because it allows the maximum vertical height adjustment with respect to the ground upon which the legs 88 rest, as opposed to a configuration in which the legs 88 are retracted parallel to the stringers 50. In the stowed position, the lowermost surface 118 is aligned with or nearly aligned with the top edge of the lower wall 14. Nearly aligned is defined as not extending above the top edge of the lower wall 14 so as not to obstruct the roof 15 from fully lowering. Nearly aligned is further defined as the lowermost surface 118 not located below the top edge with a gap that either allows inadvertent opening of the staircase 10 or intrusion of the elements when the roof 15 is fully lowered. Generally, the junction of the lowermost surface is chosen to be at a distance that allows seal 65 to contact the roof 15 as shown in FIG. 18.

Each of the stringers 50 have a locking mechanism 120 for locking the staircase 10 into its stowed position. The locking mechanisms 120 are located between the upper and lower edges 58, 56 of the stringers 50. The locking mechanisms 120 have locking pins 122 that are biased outward with a spring. The locking pins 122 have an extended position that is shown in FIG. 4 and a retracted position in which the pins 122 are more near their corresponding stringers 50. The locking pins 122 have an angled surface 124 that is designed to strike the flange 28 of the fixed frame 18 when the staircase 10 is moved from its use position to its stowed position and this pushes the locking pins 122 inward toward their corresponding stringers 50. The retracted position of the locking pins 122 (which is not shown) locates the locking pins 122 so that they clear the flanges 24. When the staircase 10 is in its stowed position, the locking pins 122 will have cleared the flange 24 of the fixed frame 18. Once the staircase 10 is in its stowed position and the locking pins 122 have cleared their corresponding adjacent flanges 24 on the fixed frame 18, the pins 122 will spring out to their extended position and lock the staircase within the fixed frame 18 as shown in FIG. 4. To release the staircase 10 from the fixed frame 18, the locking pins 122 must be retracted. The locking pins 122 are connected to linkages 126. Each linkage 126 is connected to a handle 128 that rotates and extends through the panel 60. Movement of the handle 128 pulls the linkages 126 inward and pulls the locking pins 122 into their retracted positions. The retracted position of the locking pins 122 allows them to clear the flange 28 of the fixed frame 18 and therefore, allows the staircase 10 to be moved from its stowed position, as shown in FIG. 6, to its use position shown in FIG. 7. When the staircase 10 is in its stowed position it acts as a first door that has the panel 60 acting as part of an enclosure of the camper 12 that is defined by the lower wall 14. The location of the staircase 10 in the lower wall 14 allows the structure 13 between the roof 15 and lower wall 14 to be flexibly moved because the staircase 10 does not extend beyond the lower wall 14 in its stowed position.

When the staircase 10 is pivoted into its use position that movement serves as a first door, which leaves an opening 19 in the lower wall 14. After the staircase 10 is in its use position, the door 34 and removable frame 30 may be positioned within the fixed frame 18. Once the staircase 10 is in its use position and the door 34 and its associated removable frame 30 are located within the fixed frame, door 34 acts as a second and longer door than the staircase 10 itself. When the staircase 10 is in its use position the door 34 may be pivoted between its open position, shown in FIGS. 9 and 10, and its closed position shown in FIG. 8. Both the fixed frame 18 and removable frame 30 of the door 34 are unobstructed by any part of the staircase 10. The pivot axis 80 of hinge 74 is spaced from and below the lower frame 18 and the pivot axis 80 is spaced below the removable frame 30 when it is located within the fixed frame 18.

A user of the staircase 10 will typically begin with the pop-up camper 12 having the roof 15 in its retracted position and the staircase 10 in its stowed position. When the staircase 10 is in its stowed position, the panel 60 that overlaps the stringers 50 to forms a flange 138 that overlaps the outside surface 20 of the lower wall 14 as shown in FIG. 4. This flange 138 provides a location where a seal can be installed so the staircase 10 acts as a watertight door. The panel 60 is substantially coplanar with the outside surface 20 in the stowed position. Additionally, the roof 15 may seal along the lowermost surface 118 of the lower tube 70. Because the feet 98 do not extend beyond the lowermost surface 118 of the lower tube 70, they provide no obstruction to the roof 15 in its collapsed position. The roof 15 is then moved into its raised position as shown in FIG. 6. In the raised position, the staircase 10 will be in its stowed position as shown in FIG. 6, and the door 34 with its removable frame will be located in their stowed position away from the location of the staircase 10 in its stowed position. The handle 128 on the staircase 10 will be turned so that the linkages 126 pull the locking pins 122 inward. Once the locking pins 122 are retracted, they will clear the fixed frame 18 in the lower wall 14. The staircase 10 is then lowered into the use position shown in FIG. 7, with the door 34 located remotely from the fixed frame 18. With the staircase 10 in its use position, the feet 98 are adjusted into the positions necessary to contact the ground and locate the treads substantially level. Once the feet 98 are adjusted, they are locked into the desired position with locking pins 122. The door 34 and its associated removable frame 30 are then moved into the opening 19. Once the door 34 and removable frame 30 are positioned within the fixed frame 18, the door 34 may be moved from its open and closed positions over the staircase 10 in its use position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A staircase in combination with a pop-up camper having a rigid perimeter wall extending upwardly from a floor, said perimeter wall having a top edge, said camper having an extendable roof that overlays said perimeter wall, said extendable roof movable between a collapsed position where said roof contacts said top edge of said perimeter wall and a raised position where said roof is spaced from said top edge, said perimeter wall having an opening, said staircase comprising:

said staircase pivotally affixed to said camper adjacent said opening and being pivotable about a pivot axis parallel to said floor between a stowed position and use position, said stowed position defined by said staircase located within said opening thereby closing said opening, said use position defined by said staircase located outside of said opening, said staircase having a pair of stringers and a tread connecting said stringers, said staircase including a panel affixed to said stringers and spanning said stringers, said panel substantially coplanar with an outside surface of said perimeter wall in said stowed position, said staircase having a terminal edge spaced from said pivot axis;

a pair of support legs adapted for contacting a ground surface, said support legs telescopingly received by said stringers and slidable between a retracted position and an extended position, said support legs each including a foot pivotally connected thereto, said feet having a lower end adapted for contacting a ground surface and an upper end, said upper ends of said feet mateable with pockets on said stringers when said support legs are in said retracted positions so that said feet are locked from rotation when contacting said pockets, said lower ends of said feet extending no farther than lower ends of said stringers when said upper ends of said feet are mated with said pockets; and a removable door mateable to said opening when said extendable roof is in said raised position, said door pivotable between opened and closed positions when said removable door is mated to said opening and when said removable door is mated to said opening and said staircase is in said use position.

2. The folding staircase of claim 1, where said legs are substantially parallel to said removable door when said removable door is in said closed position within said opening and when said stringers are in said use position.

3. The folding staircase of claim 2, wherein said terminal edge is closer to said floor than said top edge of said perimeter wall when said staircase is in said stowed position.

4. The folding staircase of claim 3, wherein said feet having a lower surface orthogonally oriented with respect to said panel when said legs are in said retracted position.

5. The folding staircase of claim 4, wherein said lower surface of said feet aligned with said terminal edge of said panel when said legs are in said retracted position.

6. The folding staircase of claim 2, wherein said support legs obliquely angled with respect to said panel.

7. The folding staircase of claim 2, further comprising a lower tube located on said staircase on a terminal end and connecting said stringers, said lower tube having a seal sealing to said roof when said extendable roof is in said collapsed position and said staircase is in said stowed position.

8. The folding staircase of claim 2, wherein said panel including seals near lateral edges, said seals near said lateral edges sealing said panel to said opening when said staircase is in said stowed position.

9. A folding staircase for attachment to a pop-up camper, said pop-up camper having a perimeter wall and a floor, said perimeter wall having an opening for receiving a removable frame for a removable door, said removable frame for supporting said door and said door pivotable between an opened and closed position when said removable frame is within said opening in said perimeter wall, said folding staircase comprising:
   a pair of stringers spanned by a tread, said staircase having a lower end and an upper end for pivoting near an outer surface of said wall;
   a hinge having a pivot axis outside said outer wall surface and parallel to said floor when said staircase is attached to said pop-up camper, said hinge having an end for connecting to a structure adjacent to said opening and another end connected to said stringers, said stringers pivotable about said pivot axis between a use position wherein said stringers are located outside of said outer wall surface and a stowed position wherein said stringers are located within said opening and said stringers are on an opposite side of said pivot axis than when said stringers are in said use position;
   a pair of support legs for contacting a ground surface, said support legs telescopingly received within said stringers and slidable between a retracted position and an extended position, said support legs each including a foot pivotally connected thereto, said feet having a lower end for contacting a ground surface and an upper end, said upper ends of said feet mateable with pockets on said stringers when said support legs are in their retracted positions so that said feet are locked from rotation when contacting said pockets and said lower ends of said feet extending no farther than said lower ends of said stringers when said upper ends of said feet contact said pockets; and
   said door pivotable between said opened and closed positions when said door is within said opening of said perimeter wall and said stringers are in said use position.

10. The folding staircase of claim 9, where said legs are substantially parallel to said perimeter wall when said stringers are in said use position.

11. The folding staircase of claim 10, wherein a panel is affixed to said stringers, said panel spanning said stringers.

12. The folding staircase of claim 11, wherein said panel extends beyond said stringers to form a flange, said panel having seals to seal said panel to said perimeter wall when said folding staircase is in said stowed position.

13. A system comprising:
   a pop-up camper having a roof, a floor, and a wall having an opening, said roof movable between a collapsed position where said roof is contacting said wall and a raised position where said roof is spaced above said wall;
   a staircase pivotally affixed to said wall adjacent said floor and being pivotable between a stowed position and use position, said stowed position locating said staircase within said opening thereby closing said opening, said use position locating said staircase outside of said opening, said staircase having a pair of stringers and a tread spanning said stringers, said staircase including a panel affixed to said stringers, said panel in biased contact with said wall in said stowed position;
   a pair of support legs for contacting a ground surface, said support legs telescopingly received within said stringers and slidable between a retracted position and an extended position, said support legs each including a foot pivotally connected thereto, said feet having a lower end for contacting said ground surface and an upper end, said upper ends of said feet mateable with a pockets on said stringers when said support legs are in their retracted positions so that said feet are locked from rotation when contacting said pockets.

14. The system of claim 13, wherein said panel includes lateral edges and a terminal edge, said panel includes seals affixed to said lateral edges and said terminal edge, said seals on said lateral edges sealing to said wall and said seal on said terminal edge sealing to said roof when said staircase is in said stowed position and said roof is in said collapsed position.

15. The system of claim 13, wherein said panel includes lateral edges having seals affixed thereto, said seals on said lateral edges sealing to said wall when said staircase is in said stowed position.

16. The system of claim 13, where said legs are substantially parallel to said wall when said stringers are in said use position.

17. The system of claim 13, wherein said panel has lateral edges and extends beyond said stringers, said panel has a terminal edge that is substantially aligned with a lowermost surface on a lower tube, said lower tube connecting said stringers.

18. The system of claim 13, wherein said system includes a removable frame having a door, said removable frame for being received in said opening, said door pivotable between an opened and closed positions when said removable frame is in said opening and when said staircase is in said use position.

19. The system of claim 13, wherein and said lower ends of said feet extending no farther than said stringers when said upper ends of said feet contact said pockets.

* * * * *